UNITED STATES PATENT OFFICE.

BIRGER FJELD HALVORSEN AND CHRISTIAN HÖRBYE, OF CHRISTIANIA, NORWAY.

MANUFACTURE OF SULFUR DYES.

1,310,751.     Specification of Letters Patent.     Patented July 22, 1919.

No Drawing.     Application filed November 23, 1918. Serial No. 263,906.

*To all whom it may concern:*

Be it known that we, BIRGER FJELD HALVORSEN and CHRISTIAN HÖRBYE, both subjects of the King of Norway, and residents of Christiania, Norway, have invented certain new and useful Improvements in the Manufacture of Sulfur Dyes; and we do hereby declare the following to be a full, clear, and exact description of the invention, such as will enable others skilled in the art to which it appertains to make and use the same.

This invention relates to the manufacture of sulfur dyes and has for its object a process of producing dyes of this class having a brown color.

As is known considerable quantities of cymol are obtained as a by-product in the manufacture of cellulose according to the sulfite process.

Hitherto no great importance has been attached to the problem of recovering this substance, but lately attempts have been made to utilize it. These attempts have not, however, as far as known led to useful results. According to the present invention cymol can now be employed for the manufacture of dyes.

This is obtained by converting the cymol into p-toluic acid, nitrating this substance to form nitro-compounds, and then melting these compounds with polysulfids.

The cymol may be converted into p-toluic acid by oxidation for instance by means of nitric acid. The nitration of this latter substance may suitably be effected with a mixture of nitric acid and sulfuric acid. By means of heating the nitro-toluic acids obtained hereby with polysulfids the nitro compounds are converted into dye-stuffs. The resulting melt is suitably dissolved in water. From the solution the dye-stuffs could be precipitated in the usual manner, viz., by oxidation with air or by means of acids. The nitro-compounds obtained from the p-toluic acid can be employed without special preparation. It is of advantage, however, to produce the mono- and di-nitro compounds separately because it is hereby made more easy to produce the desired shade of color. When for instance mononitro-toluic acid is used in the sulfur melt the following proportions are found to be suitable:

50 gram nitro-para-toluic acid,
170 gram sulfid of sodium,
60 gram of sulfur, and
50 gram water are heated on an oil bath during 12 hours up to about 250° C. Hereby is obtained a dye-stuff which on cotton directly produces a dark chestnut color.

When di-nitrotoluic acid is employed in the sulfur melt for instance in the following proportion:

40 gram di-nitro-p-toluic acid,
140 gram sulfid of sodium,
50 gram of sulfur,
50 gram of water heated on an oil bath for 12 hours at a temperature up to about 250° C. a dye stuff is obtained, which also produces a brown color directly on cotton.

We claim:

1. Process for the manufacture of brown sulfur dyes comprising the steps of melting nitro compounds of p-toluic acid with polysulfids.

2. Process for the manufacture of brown sulfur dyes from cymol consisting in converting this latter substance into p-toluic acid nitrating the p-toluic acid and melting the resulting nitro products with polysulfids.

In testimony that we claim the foregoing as our invention, we have signed our names in presence of two subscribing witnesses.

BIRGER FJELD HALVORSEN.
CHRISTIAN HÖRBYE.

Witnesses:
C. NORMAN,
C. FABRICIUS HANSEN.